US007389291B1

(12) United States Patent
Shavit et al.

(10) Patent No.: US 7,389,291 B1
(45) Date of Patent: Jun. 17, 2008

(54) IMPLEMENTING OPTIMISTIC CONCURRENT DATA STRUCTURES

(75) Inventors: Nir N. Shavit, Cambridge, MA (US); Edya Ladan-Mozes, Tel-Aviv (IL)

(73) Assignee: Sun Microsystems, Inc., Santa Clara, CA (US)

( * ) Notice: Subject to any disclaimer, the term of this patent is extended or adjusted under 35 U.S.C. 154(b) by 554 days.

(21) Appl. No.: 10/867,843

(22) Filed: Jun. 15, 2004

(51) Int. Cl.
*G06F 17/30* (2006.01)
(52) U.S. Cl. ...................................... 707/8; 707/103 R
(58) Field of Classification Search ................ 707/103, 707/8, 103 R; 711/147; 710/54
See application file for complete search history.

(56) References Cited

U.S. PATENT DOCUMENTS

| 6,173,373 B1 * | 1/2001 | Bonola ........................ 711/147 |
| 6,668,291 B1 * | 12/2003 | Forin et al. .................... 710/54 |
| 2001/0047361 A1 * | 11/2001 | Martin et al. ............ 707/103 R |
| 2001/0056420 A1 * | 12/2001 | Steele et al. ..................... 707/8 |

OTHER PUBLICATIONS

M. M. Michael. "CAS-Based Lock-Free Algorithm for Shared Deques" The Ninth Euro-Par Conference on Parallel Processing, LNCS vol. 2790, pp. 651 660, Aug. 2003.*
J. M. O'Connor and M. Tremblay. "Picojava-I: The Java Virtual Machine in Hardware." IEEE, vol. 17, Issue 2, Mar.-Apr. 1997 pp. 45-53.*
D. Fober, Y. Orlarey and S. Letz. "Lock-Free Techniques for Concurrent Access to Shared Objects" Actes des Journées d'Informatique Musicale JIM2002, Marseille GMEM 2002 pp. 143-150.*

N. S. Arora, B. Blumofe, and C. G. Plaxton. "Thread scheduling for multiprogrammed multiprocessors" In Proceedings of the 10th Annual ACM Symposium on Parallel Algorithms and Architectures, pp. 119-129, 1998.*
"A Methodology for Implementing Highly Concurrent Data Objects" by Maurice Herlihy, as published in ACM Transactions on Programming Languages and Systems, vol. 15, No. 5, Nov. 1993, pp. 745-770.
"Elimination Trees and the Construction of Pools and Stacks" by Nir Shavit MIT and Tel-Aviv University, and Dan Touitou Tel-Aviv University, Feb. 28, 1996 (preliminary version previously published in the 7th Annual Symposium on Parallel Algorithms and Architectures (SPAA), 30 pages.

(Continued)

*Primary Examiner*—Hosain Alam
*Assistant Examiner*—Jieying Tang
(74) *Attorney, Agent, or Firm*—Osha Liang LLP (57) ABSTRACT

A concurrent FIFO queue is implemented as an "optimistic" doubly-linked list. Nodes of the optimistic doubly-linked list are allocated dynamically and links between the nodes are updated optimistically, i.e., assuming that threads concurrently accessing the FIFO queue will not interfere with each other, using a simple store operation. Concurrent, linearizable, and non-blocking enqueue and dequeue operations on the two ends of the doubly-linked list proceed independently, i.e., disjointly. These operations require only one successful single-word synchronization operation on the tail pointer and the head pointer of the doubly-linked list. If a bad ordering of operations on the optimistic FIFO queue by concurrently executing threads creates inconsistencies in the links between the nodes of the doubly-linked list, a fix-up process is invoked to correct the inconsistencies.

9 Claims, 9 Drawing Sheets

OTHER PUBLICATIONS

"The Performance of Spin Lock Alternatives for Shared-Memory Multiprocessors" by Thomas E. Anderson, as published in IEEE Transactions on Parallel and Distributed Systems, vol. 1, No. 1, Jan. 1990, 11 pages.

"Safe Memory Reclamation for Dynamic Lock-Free Objects Using Atomic Reads and Writes" by Maged M. Michael; PODC 2002, Jul. 21-24, 2002, Monterey California, USA, 11 pages.

"Algorithms for Scalable Synchronization on Shared-Memory Multiprocessors" by John M. Mellor-Crummey and Michael L. Scott, as published in ACM Transactions on Computer Systems, vol. 9, No. 1, Feb. 1991, pp. 21-65.

"Nonblocking Algorithms and Preemption-Safe Locking on Multiprogrammed Shared Memory Multiprocessors" by Maged M. Michael and Michael L. Scott as published by Academic Press, 0743-7315/98, 1998, 26 pages.

"Linearizability: A Correctness Condition for Concurrent Objects" by Maurice P. Herlihy and Jeannette M. Wing, as published in ACM Transactions on Programming Languages and Systems, vol. 12, No. 3, Jul. 1990, pp. 463-492.

"The Repeat Offender Problem: A Mechanism for Supporting Dynamic-Sized, Lock-Free Data Structures" by Maurice Herlihy of the Computer Science Department, Box 1910, Brown University, Providence, RI 02912, Victor Luchangco of Sun Microsystems Laboratories, 1 Network Drive, Burlington, MA 01803, and Mark Moir (15 pages).

"Scalable Concurrent Counting" by Maurice Herlihy, Beng-Hong Lim and Nir Shavit on Aug. 12, 1994 (preliminary version previously appeared in the Proceedings of the 3rd Annual ACM Symposium on Parallel Algorithms and Architectures, Jul. 1992, San Diego, CA (31, pages).

"A Steady State Analysis of Diffracting Trees" by Nir Shavit, Eli Upfal and Asaph Zemach on Jul. 15, 1997 (26 pages).

"Diffracting Trees" by Nir Shavit and Asaph Zemach on Aug. 15, 1996 (preliminary version of this work previously appeared in the proceedings of the Annual Symposium on Parallel Algorithms and Architectures (SPAA), Jun. 1994 (50 pages).

"Combining Funnels: A Dynamic Approach to Software Combining" by Nir Shavit and Asaph Zemach, Jul. 6, 1999 (preliminary version of this work appeared in Principals of Distributed Computing (PODC98)) (30 pages).

"Waiting Algorithms for Synchronization in Large-Scale Multiprocessors" by Beng-Hong Lim and Anant Agarwal as published in ACM Transactions on Computer Systems, vol. 11, No. 3, Aug. 1993 (39 pages).

"Simple, Fast, and Practical Non-Blocking and Blocking Concurrent Queue Algorithms" by Maged M. Michael and Michael L. Scott of Department of Computer Science, University of Rochester, Rochester, NY 14627-0026 (this work was supported in part by NSF grant Nos. CDS-94-01142 and CCR-93-19445, and by ONR research grant No. N00014-92-J-1801 in conjunction with the DARPA Research in Information Science and Technology-High Performance Computing, Software Science and Technology program, ARPA Order No. 8930) (8 pages).

"Speculative Lock Elision: Enabling Highly Concurrent Multithreaded Execution" by Ravi Rajwar and James R. Goodman, as published in the Proceedings of the 34th International Symposium on Microarchitecture (MICRO), Dec. 3-Dec. 5, 2001 (12 pages).

"Implementing Lock-Free Queues" by John D. Valois, as published in Proceedings of the Seventh International Conference on Parallel and Distributed Computing Systems, Las Vegas, NV, Oct. 1994 (9 pages).

"Non-Blocking Algorithms for Concurrent Data Structures" by Sundeep Prakash, Yann-Hang Lee and Theodore Johnson, Dept. of Computer and Information Sciences, University of Florida on Jul. 1, 1991 (40 pages).

"Algorithms for Scalable Synchronization on Shared-Memory Multiprocessors" by John M. Mellor-Crummey, supported in part by the National Science Foundation under Cooperative Agreement CCR-8809615, and Michael L. Scott supported in part by the National Science Foundation Under Institutional Infrastructure grant CDA-8822724, Jan. 1991 (41 pages).

"Queue Locks on Cache Coherent Muiltiprocessors" by Peter Magnusson, Anders Landin of the Swedish Institute of Computer Science and Erik Hagersten of Sun Microsystems (7 pages).

"Building FIFO and Priority-Queuing Spin Locks from Atomic Swap" by Travis S. Craig, Department of Computer Science and Engineering, FR-35, University of Washington on Feb. 1, 1993 (29 pages).

"Atomic Snapshots of Shared Memory" by Yehuda Afek, Hagit Attiya, Danny Dolev, Eli Gafni, Michael Merrittand Nir Shavit (preliminary version of this paper appeared in the Proceedings of the 9th Annual ACM Symposium on Principles of Distributed Computing [Quebec City, Quebec, August] ACM, New York, 1990 (21 pages).

"DCAS-Based Concurrent Deques" by Ole Agesen, David L. Detlefs, Christine H. Flood, Alexander T. Garthwaite, Paul A. Martin, Nir N. Shavit and Guy L. Steele, Jr. (10 pages).

"Wait-Free Synchronization" by Maurice Herlihy as published by Association for Computing Machinery, 1991 0164-0925/91/0100-0124 (preliminary version of this paper appeared in the Proceedings of the 7th ACM SIGACT-SIGOPS Symposium on Principles of Distributed Computing [Aug. 1988]) pp. 124-149.

"Obstruction-Free Synchronization: Double-Ended Queues as an Example" by Maurice Herlihy, Computer Science Department, Brown University, Box 1910, Providence, RI 02912; and Victor Luchangco and Mark Moir of Sun Microsystems Laboratories, 1 Network Drive, UBUR02-311, Burlington, MA 01803 (8 pages).

"Practical Implementations of Non-Blocking Synchronization Primitives" by Mark Moir, of the Department of Computer Science, University of Pittsburgh, Pittsburgh, PA 15260, work supported in part by an NSF CAREER Award, CCR 9702767 (10 pages).

\* cited by examiner

```
1   struct pointer_t {
2     <ptr, tag>: <node_t *, short>
3   };
4
5   struct node_t
6     data_type  value;
7     pointer_t  next;
8     pointer_t  prev;
9   };
10
11  struct queue_t {
12    pointer_t tail;
13    pointer_t head;
14    node_t    dummy;
15  };
```

FIGURE 6A

```
1   void enqueue(queue_t q, data_type val)
2           pointer_t tail
3           nd = new_node()
4           nd->value = val
5           while(TRUE){
6               tail = q->tail
7               nd->next.tag = tail.tag+1
8               nd->next.ptr = tail.ptr
9               if CAS(&(q->tail), tail, (nd, tail.tag+1)) {
10                  (q->tail.ptr)->prev = (nd, tail.tag)
11                  break
12          }}
```

FIGURE 6B

```
1   data_type dequeue()
2        pointer_t tail, head, firstNodePrev
3        data_type val
4        while(TRUE){
5             head.con = q->head          // first read the head
6             tail.con = q->tail          // then read the tail
7             if (head == q->head){       // head and tail consistency check
8                  firstNodePrev = (q->head.ptr).prev
9                  if (head.ptr != dummy) { //not the dummy node
10                      if (tail != head){    //more than 1 node
11                           if (firstNodePrev.tag != head.tag){
12                                fixList(tail, head)
13                                continue
14                           }
15                      }
16                      else{                 //tail and head point to the last node
17                           if CAS(&(q->tail), tail ,(dummy, tail.tag+1)){
18                                (q->head.ptr).prev = (dummy, tail.tag)
19                           }
20                           continue;
21                      }
22                      if CAS(&(q->head), head, (firstNodePrev.ptr, head.tag+1)){
23                           val = (q->head.ptr).value
24                           free (head.ptr)
25                           return val
26                      }
27                 }
28                 else {                   // head points to the dummy node
29                      if (tail.ptr == dummy){
30                           return NO_VALUE; //queue is empty
31                      }
32                      else{                // advance the head (skip the dummy)
33                           if (firstNodePrev.tag != head.tag){
34                                fixList(tail, head);
35                                continue;
36                           }
37                           CAS(&(q->head), head, (firstNodePrev.ptr, head.tag+1));
38   }}}}
```

FIGURE 6C

```
1   void fixList(pointer_t tail, pointer_t head)
2      pointer_t tmp, tmp1
3      tmp1 = tail
4      while((head == q->head) && (tmp1 != head)){ // head not changed and
5         // tmp1 not at head
6         if (tmp1.ptr == dummy){        // tail points to dummy and head not
7            (q->head.ptr).prev = (tmp1.ptr, tmp1.tag-1) //set prev of head to dummy
8            return
9         }
10        tmp = (tmp1.ptr).next
11        if (tmp.tag != tmp1.tag){      //tmp, tmp1 tags must equal
12           return;
13        }
14        if (((tmp.ptr).prev.ptr != tmp1.ptr) || ((tmp.ptr).prev.tag != tmp1.tag-1)){
15           (tmp.ptr).prev. = (tmp1.ptr, tmp1.tag-1);
16        }
17        tmp1 = (tmp.ptr, tmp1.tag-1);
18   }}
```

IMPLEMENTING OPTIMISTIC CONCURRENT DATA STRUCTURES

BACKGROUND OF INVENTION

Figure 1:
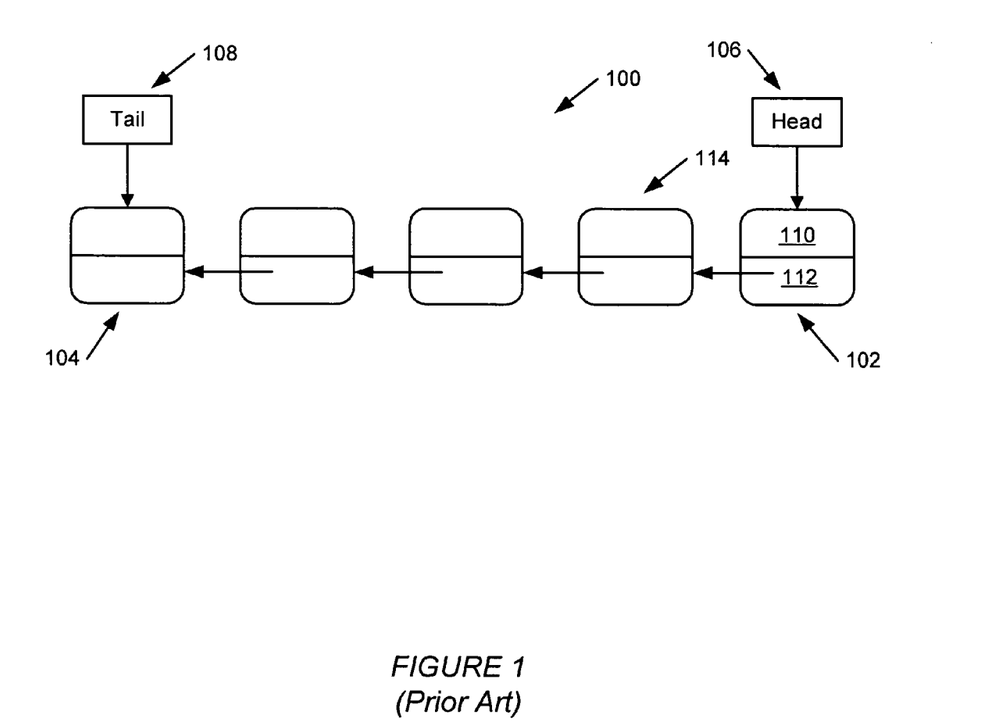
FIG. 1 shows a typical FIFO queue.

Computer systems use various data structures to store and manipulate data during program execution. One type of such a data structure, shown in FIG. 1, is a first-in-first-out (FIFO) queue. A FIFO queue (100) is a data structure in which cells are removed in the same order in which the cells were added. The removal of an existing cell (e.g., 102) takes place at one end, typically referred to as the "head" of the queue (100), and the addition of a new cell (e.g., 104) takes place at the other end, typically referred to as the "tail" of the queue (100). The operation that adds a new cell (e.g., 104) to the queue (100) is called a "enqueue" operation, and the operation that removes a cell (e.g., 102) from the queue (100) is called a "dequeue" operation. A FIFO queue (100) may be represented in the memory of a computer system as a singly-linked list. In such a representation, each cell (e.g., 102) of the queue (100) includes a value location (e.g., 110) and a pointer (e.g., 112) to the next cell (e.g., 114) in the queue (100). A tail pointer (108) points to the youngest node in the singly-linked list, and a head pointer (106) points to the oldest node.

Concurrent FIFO queues are one type of often-used concurrent data structures. A concurrent FIFO queue is a data structure sharable by concurrently executing threads that supports the usual enqueue and dequeue operations with linearizable FIFO semantics. Linearizability guarantees that queue operations appear atomic and can be combined with other operations in a modular way. In other words, linearizability provides the illusion that each operation on a concurrent FIFO queue applied by concurrent threads takes effect instantaneously at some point between invocation and response. The threads appear to be interleaved at the granularity of complete operations, and the order of non-overlapping operations is preserved.

Generally, implementations of concurrent FIFO queues are of two types: blocking (i.e., lock-based) and non-blocking (i.e., lock-free). In general, lock-based FIFO queue implementations offer limited robustness as processes are forced to wait to access a FIFO queue until a current process completes its access to the FIFO queue.

An implementation of a data structure is non-blocking (i.e., lock-free) if the implementation guarantees that at least one thread of those trying to update the data structure concurrently will succeed in completing its operation on the data structure within a bounded amount of time, assuming that at least one thread is active, regardless of the state of other threads. Non-blocking implementations generally rely on hardware support for an atomic primitive (i.e., a synchronization operation) such as a compare-and-swap instruction or the instruction pair load-linked and store-conditional.

A compare-and-swap instruction may operate on a single memory word or two memory words in single atomic operation. A single-word compare-and-swap operation (CAS) typically accepts three values, or quantities: a memory address A, a comparison value C, and a new value N. The CAS operation fetches and examines the contents V of memory at address A. If the contents V is equal to the comparison value C, then the new value N is stored into the memory location at address A, replacing the contents V. A Boolean return value indicates whether the replacement occurred. Whether V matches C, V is returned or saved in a register for later inspection (possibly replacing either C or N, depending on the implementation). Such an operation may be notated as "CAS(A, C, N)."

A double-word compare-and-swap operation (DCAS) typically accepts six values: two memory addresses $A_1$ and $A_2$, two comparison values $C_1$ and $C_2$, and two new values $N_1$ and $N_2$. The DCAS operation fetches and examines the contents $V_1$ of memory at address $A_1$ and $V_2$ of memory at address $A_2$. If the contents $V_1$ are equal to the comparison value $C_1$ and the contents $V_2$ are equal to the comparison value $C_2$, then the new value $N_1$ is stored into the memory-location at address $A_1$, replacing $V_1$, and the new value $N_2$ is stored into the memory location at address $A_2$, replacing $V_2$. A Boolean return value indicates whether the replacement occurred. Whether $V_1$ and $V_2$ matches $C_1$ and $C_2$, respectively, $V_1$ and $V_2$ are returned or saved in a register for later inspection. Such an operation may be notated as "DCAS($A_1$, $A_2$, $C_1$, $C_2$, $N_1$, $N_2$)."

Load-linked and store-conditional operations must be used together to read, modify, and write a shared location. A load-linked operation returns the value stored at the shared location. A store-conditional operation checks if any other processor has since written to that shared location. If not, the location is updated and the operation returns success; otherwise, it returns failure.

Concurrent data structure implementations in non-garbage collected programming languages (e.g., the C programming language) that use CAS operations are susceptible to what is known as the ABA problem. If a thread reads a value A from a shared location, computes a new value, and then attempts a CAS operation, the CAS operation may succeed when it should not, if between the read and the CAS operation, other threads change the value of the shared location from A to B and back to A again (i.e., an ABA event). A typical solution to the ABA problem is to include a tag with the target memory location such that both are manipulated atomically and the tag is incremented with updates of the target location. The ABA problem does not occur in concurrent data structures implemented in garbage collected languages (e.g., the Java™ programming language).

One approach to implementing a concurrent FIFO queue is based on the algorithm of Michael and Scott (hereinafter the "MS-queue"). See Michael, M. M., and Scott, M. L., "Simple, Fast, and Practical Non-Blocking and Blocking Concurrent Queue Algorithms," *Proceedings of the 15th Annual ACM Symposium on Principles of Distributed Computing* (1996) pp. 267-275. A key feature of this algorithm is that it permits uninterrupted parallel access to the head and tail of the FIFO queue.

Figure 2:
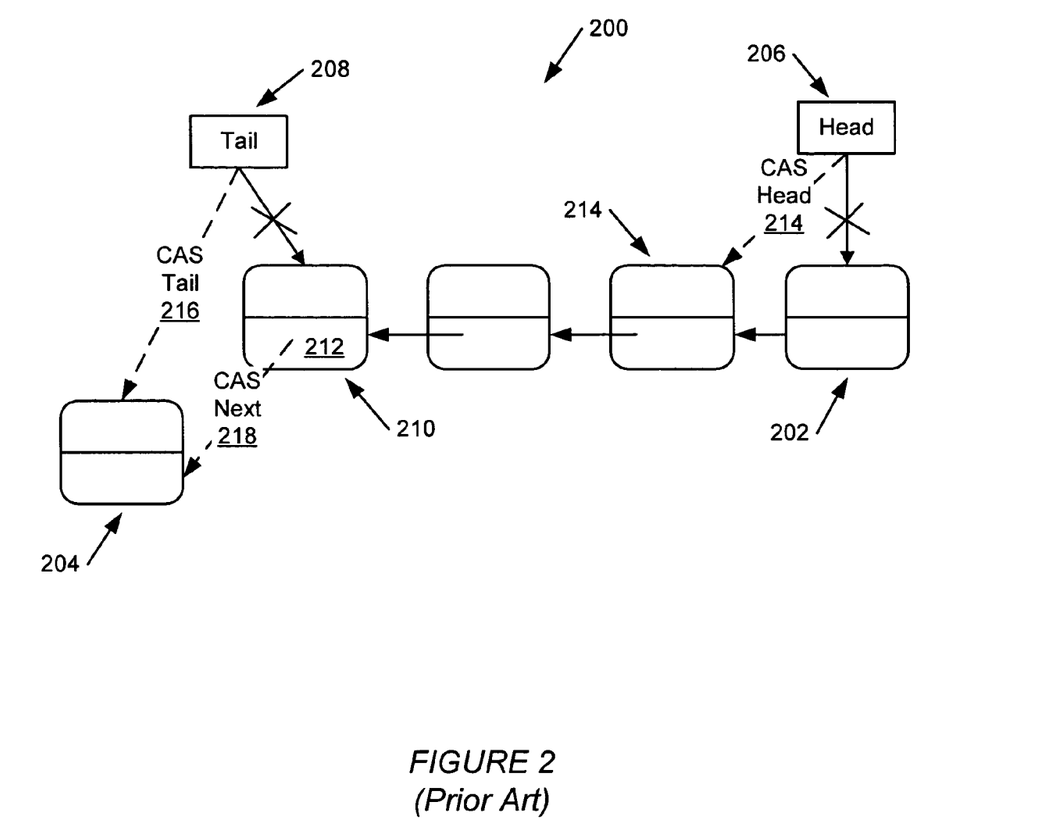
FIG. 2 shows a flow diagram of a typical concurrent FIFO queue.

FIG. 2 shows a flow of an MS-queue implementation. An MS-queue (200) is based on concurrent manipulation of a single-linked list. The dequeue operation requires a single successful CAS operation (CAS Head (214)) on the head pointer (206) in order to complete the removal of a node (202) at the head of the MS-queue (200). The enqueue operation requires two successful CAS operations (CAS Next (218), CAS Tail (216)), one on the next pointer (212) and one on the tail pointer (208) of the node (210) previously at the end of the MS-queue (200), in order to complete the addition of a new node (204) at the tail of the MS-queue (200). Requiring two successful CAS operations to complete an enqueue operation potentially increases contention for the MS-queue (200), and there are more opportunities for failed CAS operations. In addition, overall performance may be impacted. A CAS operation takes an order-of-magnitude longer to execute than simple load or store operations because a CAS operation typically requires exclusive ownership and flushing of the instruction pipeline of the processor.

SUMMARY OF INVENTION

According to one aspect of one or more embodiments of the present invention, a method of performing computer system operations comprises: implementing a data structure in memory, the data structure being accessible by a plurality of concurrent threads; and executing lock-free operations on the data structure, where executing lock-free operations comprises (i) adding a new value to the data structure, and (ii) removing an existing value from the data structure, where the removing comprises ensuring that an association between the existing value and another value in the data structure is consistent, and wherein the ensuring comprises correcting the association by traversing a plurality of next pointers in a plurality of nodes in the doubly-linked list to correct inconsistent previous pointers in the plurality of nodes.

According to another aspect of one or more embodiments of the present invention, a method of performing computer operations comprises: implementing a dynamically-sized data structure in memory, the data structure being disjointly accessible by a plurality of concurrent threads, where a request to retrieve a value from the data structure results in removal of an oldest value stored in the data structure; and performing a lock-free operation to add a new value to the data structure, where the lock-free operation to add comprises using only a single synchronization operation.

According to another aspect of one or more embodiments of the present invention, a method for performing computer system operations comprises: implementing a concurrent first-in-first-out (FIFO) queue as a dynamically-sized doubly-linked list; and enqueuing a node in the concurrent FIFO queue, where a single single-word synchronization operation is used to change a tail pointer, wherein the single single-word synchronization operation is the only synchronization operation used during the enqueuing.

According to another aspect of one or more embodiments of the present invention, a concurrent first-in-first-out (FIFO) queue in a memory of a computer system comprises: a doubly-linked list comprising a plurality of nodes, wherein each node of the plurality of nodes comprises a value, a next pointer, and a previous pointer; a head pointer, where the head pointer points to an oldest node of the plurality of nodes; and a tail pointer, where the tail pointer points to a youngest node of the plurality of nodes, where (i) when a node is added to the doubly-linked list, a single-word synchronization operation is used to change the tail pointer, where the single-word synchronization operation is the only synchronization operation used in adding the node, and (ii) when the node is removed from the doubly-linked list, a fix-up process is executed if a previous pointer of the node is inconsistent.

According to another aspect of one or more embodiments of the present invention, a computer system comprises: a dynamically-sized data structure implemented in a memory of the computer system, the data structure being disjointly accessible by a plurality of concurrent threads; and instructions in the memory to execute lock-free operations on the data structure, where the instructions to execute lock-free operations comprise instructions to correct an inconsistent association between a value in the data structure and another value in the data structure.

According to another aspect of one or more embodiments of the present invention, a method of facilitating concurrent programming using a first-in-first-out (FIFO) queue comprises: defining the FIFO queue as a doubly-linked list of dynamically-allocated nodes; defining an enqueue operation, where the enqueue operation comprises using only one synchronization operation; and defining a dequeue operation, where the dequeue operation comprises correcting inconsistent pointers between the nodes, where an execution of any of the operations is linearizable and non-blocking with respect to any other execution of the operations.

According to another aspect of one or more embodiments of the present invention, a method of facilitating concurrent programming using a data structure comprises: defining the data structure to be dynamically sized in memory; and defining operations on the data structure, wherein the operations comprise correcting an inconsistent association between a value in the data structure and another value in the data structure, where an execution of any one of the operations is linearizable and non-blocking with respect to any other execution of the operations.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

Embodiments of the present invention relate to techniques for implementing and using a concurrent FIFO queue represented as an "optimistic" doubly-linked list (hereinafter "an optimistic FIFO queue"). Nodes of this optimistic doubly-linked list are allocated dynamically and links between the nodes are updated optimistically (i.e., assuming that threads concurrently accessing the FIFO queue will not interfere with each other) using a simple store operation rather than a synchronization operation (e.g., a CAS operation). Concurrent linearizable, non-blocking enqueue and dequeue operations on the two ends of the doubly-linked list proceed independently (i.e., are disjoint). These operations require only one successful single-word synchronization operation (e.g., a CAS operation) on the tail pointer and the head pointer of the doubly-linked list. If a bad ordering of operations on the optimistic FIFO queue by concurrently executing threads creates inconsistencies in the links between the nodes of the doubly-linked list, a fix-up process is applied to correct the inconsistencies.

The description that follows presents methods, pseudo code sequences, and data structures associated with an optimistic FIFO queue in accordance with one or more embodiments of the present invention. However, the methods, pseudo code sequences, and data structures presented will be understood by persons of ordinary skill in the art to be equally applicable to other concurrent shared data structures.

Figure 3A:
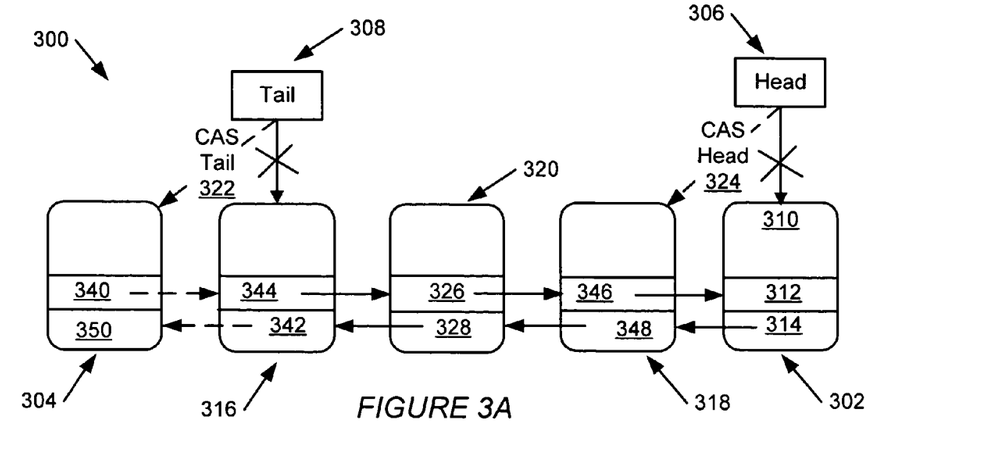
FIGS. 3A-3D show flow diagrams of a concurrent FIFO queue in accordance with one or more embodiments of the invention.

FIGS. 3A-3D show flow diagrams of various states of an optimistic FIFO queue implementation in accordance with one or more embodiments of the present invention. As shown in FIG. 3A, an optimistic FIFO queue (300) is represented as a doubly-linked list of nodes (302, 304, 316, 318, 320) with a head pointer (306) pointing to the oldest node (302) in the list, and a tail pointer (308) pointing to the newest node (304) in the list. Each node (e.g., 302) includes a value (e.g., 310), a next pointer (e.g., 312) and a previous pointer (e.g., 314). When the doubly-linked list is not empty, a next pointer (e.g., 326) of a node (e.g., 320) points to the node (e.g., 318) added to the doubly-linked list immediately prior to that node (e.g., 320), and a previous pointer (e.g., 328) of the node (e.g., 320) points to the node (e.g., 316) added to the doubly-linked list immediately after that node (e.g., 320).

Figure 3B:
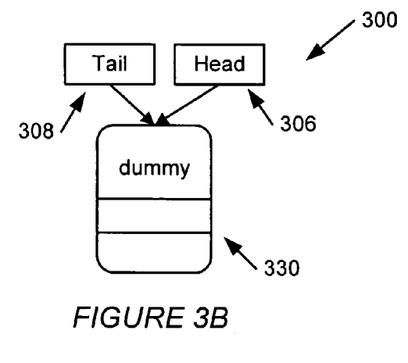

Linearizable, non-blocking enqueue and dequeue operations are provided to add a node (e.g., 304) to one end of the doubly-linked list (i.e., add a node to the tail of the queue) and to remove a node (e.g., 302) from the opposite end of the doubly-linked list (i.e., remove a node from the head of the queue), respectively, to implement the requisite FIFO semantics of the optimistic FIFO queue (300). In an embodiment of the present invention, as shown in FIG. 3B, when the optimistic FIFO queue (300) is empty, both the head pointer (306) and the tail pointer (308) point to a special node (330) referred to as a "dummy node." When an enqueue operation is executed on an empty optimistic FIFO queue, the tail pointer (308) is changed to point to the new node. The previous pointer of the dummy node (330) is changed to point to the new node and the next pointer of the new node is changed to point to the dummy node (330). When a dequeue operation is executed that removes the last node in the doubly-linked list, the head pointer (306) and the tail pointer (308) are both changed to point to the dummy node (330).

Referring back to FIG. 3A, the enqueue operation includes functionality to repetitively execute an enqueue process until a new node (e.g., 304) is successfully added to the "tail" end of the doubly-linked list. In this enqueue process, the next pointer (e.g., 340) of the new node (e.g., 304) is first set to point to the node (e.g., 316) currently at the tail of the doubly-linked list. Then, a single-word synchronization operation (e.g., CAS Tail 322) is used to attempt to atomically modify the tail pointer (308) to point to the new node (e.g., 304). If the single-word synchronization operation (e.g., CAS Tail 322) succeeds, the previous pointer (e.g., 342) of the node (e.g., 316) previously pointed to by the tail pointer (308) is changed to point to the node (e.g., 304) currently pointed to by the tail pointer (308), thereby completing the enqueue operation. If the single-word synchronization operation (e.g., CAS Tail 322) does not succeed, the enqueue process is retried. Synchronization operations are not used to change either the next pointer (e.g., 340) of the new node (e.g., 304) or the previous pointer (e.g., 342) of the node (e.g., 316) at the tail of the doubly-linked list.

By setting the next pointer (e.g., 340) in the new node (e.g., 304) before modifying the tail pointer (308), an enqueue process in accordance with one or more embodiments of the present inventions ensures that the next pointers of all nodes in the doubly-linked list are consistent (ignoring the possibility of ABA problems). A next pointer (e.g., 326) in a node (e.g., 320) is consistent if it points to a node (e.g., 318) added to the doubly-linked list immediately prior to that node (e.g., 320). If the next pointer (e.g., 340) in the new node (e.g., 304) could have been changed after the tail pointer (308) was modified, the next pointer (e.g., 340) could be inconsistent if a concurrent enqueue operation completes in the time between the tail pointer (308) modification and the changing of the next pointer (e.g., 340).

The enqueue process sets previous pointers (e.g., 342) optimistically. That is, no measures are taken to ensure that an enqueue process actually sets the previous pointer after the successful CAS operation on the tail pointer (308). Therefore, previous pointers (e.g., 314, 348, 328, 342, 350) in nodes (e.g., 302, 318, 320, 316, 304) of the doubly-linked list may be inconsistent. A previous pointer (e.g., 328) of a node (e.g., 320) is inconsistent if it does not point to a node (e.g., 316) added to the doubly-linked list immediately after that node (e.g., 320) was added. As discussed below, the dequeue operation relies on the previous pointer of the node being dequeued to determine which node is to become the new head of the doubly-linked list. Therefore, the dequeue operation includes functionality to handle the possibility that this previous pointer is inconsistent.

The dequeue operation includes functionality to repetitively execute a dequeue process until the node (e.g., 302) at the head of the queue is removed or to exit if the queue is empty. In this dequeue process, the flow if the doubly linked list includes at least two nodes that are not the dummy node is as follows. First, a determination is made as to whether the previous pointer (e.g., 314) of the node (e.g., 302) currently pointed to by the head pointer (306) is consistent. If the previous pointer (e.g., 314) is not consistent, a fix-up process is executed to repair inconsistent previous pointers in the doubly-linked list. This fix-up process walks through the doubly-linked list from the tail node (e.g., 304) to the head node (e.g., 302) using the chain of next pointers (e.g., 340, 344, 326, 346, 312) in the nodes (e.g., 304, 316, 320, 318, 302), correcting any inconsistent previous pointers. After the fix-up process completes, the dequeue process is retried.

If the previous pointer (e.g., 314) is consistent, a single-word synchronization operation (e.g., CAS Head 324) is used to attempt to atomically modify the head pointer (306) to point to the previous node (e.g., 318) in the doubly-linked list. The previous pointer (e.g., 314) in the node (e.g., 302) currently pointed to by the head pointer (306) designates which node (e.g., 318) is previous in the doubly-linked list. If the single-word synchronization operation (e.g., CAS Head 324) succeeds, the dequeue process ends. If the single-word synchronization operation (e.g., CAS Head 324) does not succeed, the dequeue process is retried. Thus, in one or more embodiments of the present invention, during the flow of the dequeue process, the single-word synchronization operation (e.g., CAS Head 324) on the head pointer (306) is the only synchronization operation used.

In embodiments of the present invention implemented in a non-garbage collected language, a tagging mechanism may be used to avoid possible ABA event problems and to provide a mechanism for detecting inconsistent previous pointers. A tag (not shown) is added to each pointer (i.e., the head pointer (306), the tail pointer (308), the next pointers (e.g., 340, 344, 326, 346, 312), and the previous pointers (e.g., 314, 348, 328, 342, 350)) in the optimistic FIFO queue (300) and functionality is added to the enqueue and dequeue operations to use these tags to avoid ABA problems. In addition, the dequeue operation uses the tags to detect the presence of inconsistent previous pointers. The tags in the head pointer (306) and the tail pointer (308) are atomically modified in the single-word synchronization operations that modify the head pointer (306) and the tail pointer (308) during the dequeue and enqueue operations, respectively. An embodiment of such a tagging mechanism is presented in the pseudo code of FIGS. 6A-6D.

In embodiments of the present invention implemented in a garbage collected language, the next and previous pointers may be initialized to a null value when a new node is created. If the next successful enqueue operation that changed the tail pointer (308) does not also modify this previous pointer (e.g., 350) because it was delayed or halted, the previous pointer remains null. During a subsequent dequeue operation, if the previous pointer (e.g., 314) of the node (e.g., 302) pointed to by the head pointer (306) contains a null value, a fix-up process is executed.

Figure 3C:
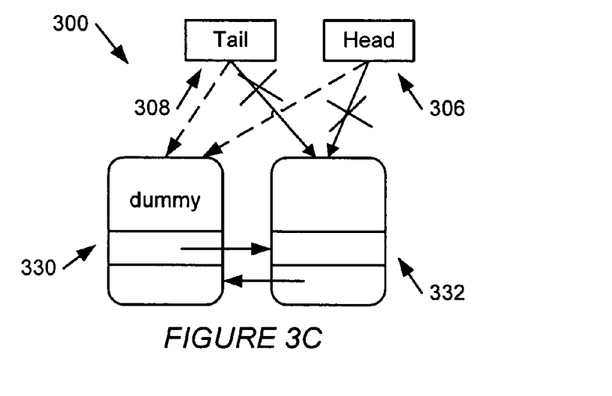

In one or more embodiments of the present invention, the optimistic FIFO queue (300) may enter certain atypical states that are addressed as a part of the dequeue process. In an embodiment of the present invention, as shown in FIG. 3C, the repetitive dequeue process of the dequeue operation includes functionality to handle a state in which the optimistic FIFO queue (300) has only one node (e.g., 332). When there is only one node (e.g., 332) in the doubly-linked-list, both the head pointer (306) and the tail pointer (308) point to that node (e.g., 332). The removal of this node (e.g., 332) includes two steps. First, the tail pointer (308) is atomically modified using a single-word synchronization operation to point to the dummy node (330). Then, the head pointer (306) is atomically modified using a single-word synchronization operation to point to the dummy node (330). Note that this sequence of operations permits the optimistic FIFO queue (300) to exist in a state where the tail pointer (308) points to the dummy node and the head pointer (306) does not. Additional functionality is provided in the dequeue process to detect and handle this state so that concurrent dequeue operations execute correctly. Because this sequence ensures that the tail pointer (308) is either pointing to the single node (e.g., 332) or to the dummy node, concurrent enqueue operations can continue to insert new nodes in the doubly-linked list.

Figure 3D:
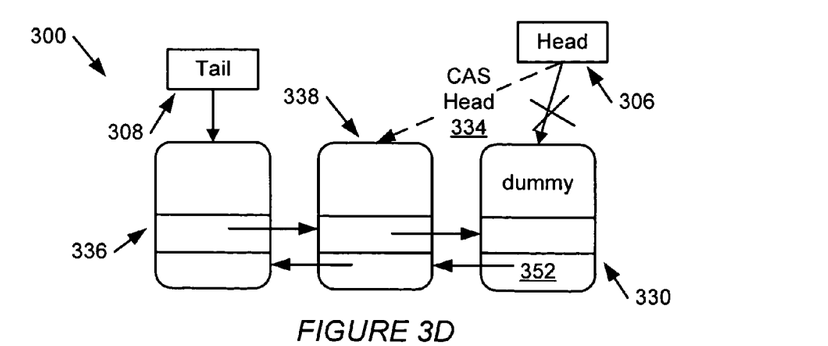

In an embodiment of the present invention, as shown in FIG. 3D, the repetitive dequeue process of the dequeue operation includes functionality to handle the state of the optimistic FIFO queue (300) when the head pointer (306) points to the dummy node (300) while the tail pointer (308) points to another node (e.g., 336). This state occurs when a node is added to an empty optimistic FIFO queue (300). As previously described, when an optimistic FIFO queue (300) is empty, both the head pointer (306) and the tail pointer (308) point to the dummy node (330). When a new node is added to the empty optimistic FIFO queue (300) with the enqueue operation, the tail pointer (308) and the previous pointer (352) of the dummy node (330) are changed to point to the new node. The head pointer (306) remains pointing to the dummy node. The dequeue process detects this state and uses a single-word synchronization instruction (e.g., CAS Head 334) to modify the head pointer (306) to point to the oldest node (e.g., 338) in the optimistic FIFO queue (300) (i.e., the node (e.g., 338) pointed to by the previous pointer (352) of the dummy node (330)). In this case, a value is not returned and the dequeue process loops again the dequeue operation.

Figure 4:
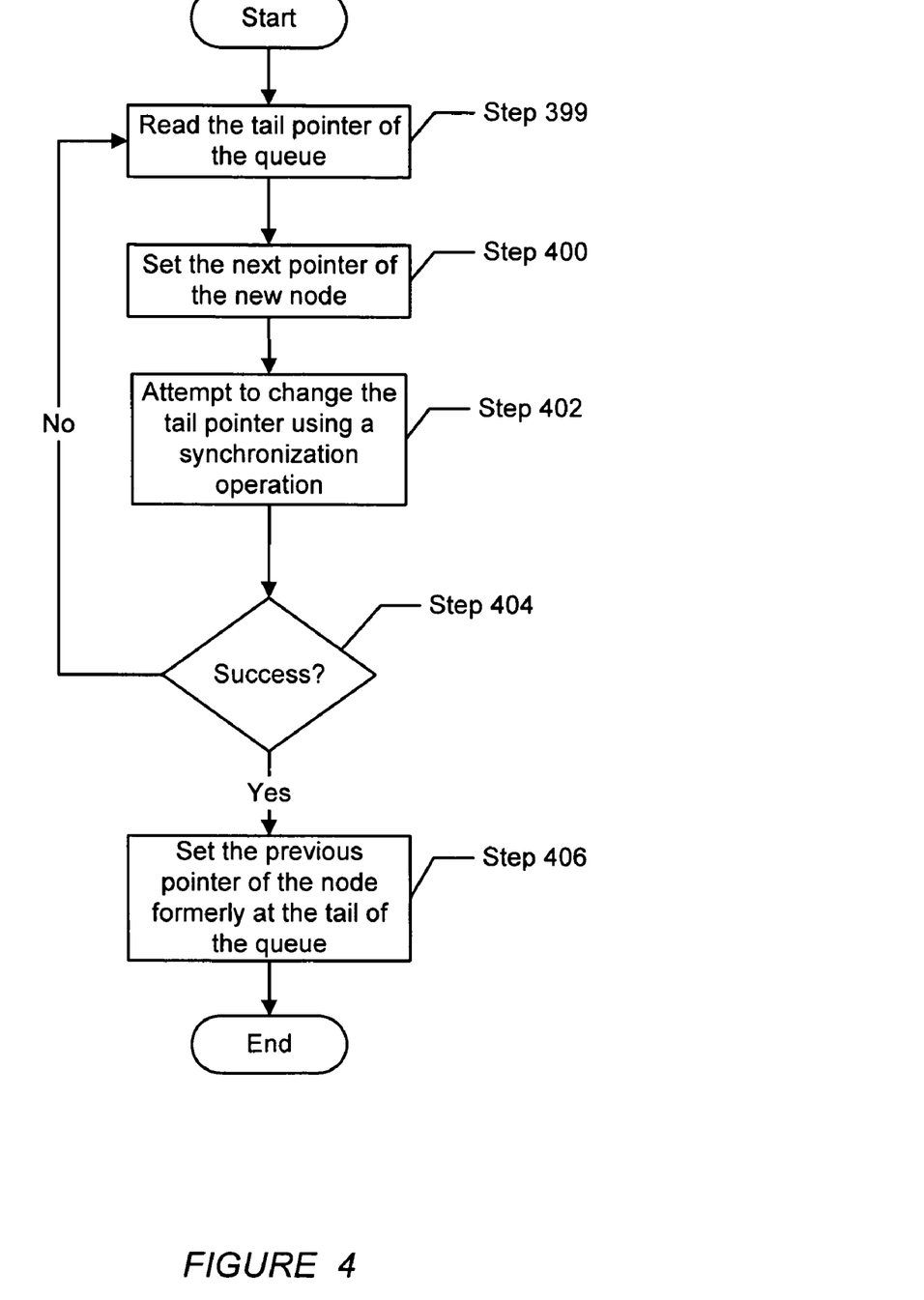
FIGS. 4 and 5 show flowcharts in accordance with one or more embodiments of the invention.

FIG. 4 shows an exemplary flow process for a lock-free enqueue operation on an optimistic FIFO queue in accordance with an embodiment of the present invention. Concurrently executing threads execute the steps of this flow process when enqueuing nodes on an optimistic FIFO queue represented as a doubly-linked list with a head pointer and a tail pointer. First, the enqueue process reads the current tail of the queue (Step 399). Then, the next pointer of the node to be enqueued is set by, for example, a store operation to point the node currently at the tail of the doubly-linked list (Step 400). This pointer setting is accomplished without execution of a synchronization operation. Then, an attempt is made to change the tail pointer of the optimistic FIFO queue to point to the node to be enqueued (Step 402). This attempt is made using a single-word synchronization operation. If the single-word synchronization operation is not successful (Step 404), the enqueue operation is tried again (Step 399). The cycle of setting the next pointer of the node to be enqueued and attempting to change the tail pointer may be repeated until the single-word synchronization operation completes successfully (Steps 399-404). If the single-word synchronization operation is successful (Step 404), the previous pointer of the node formerly at the tail of the doubly-linked list is set by, for example, a store operation to point to the node to be enqueued (Step 406), thereby completing the enqueue operation. This setting of the previous pointer is accomplished without execution of a synchronization operation.

Figure 5:
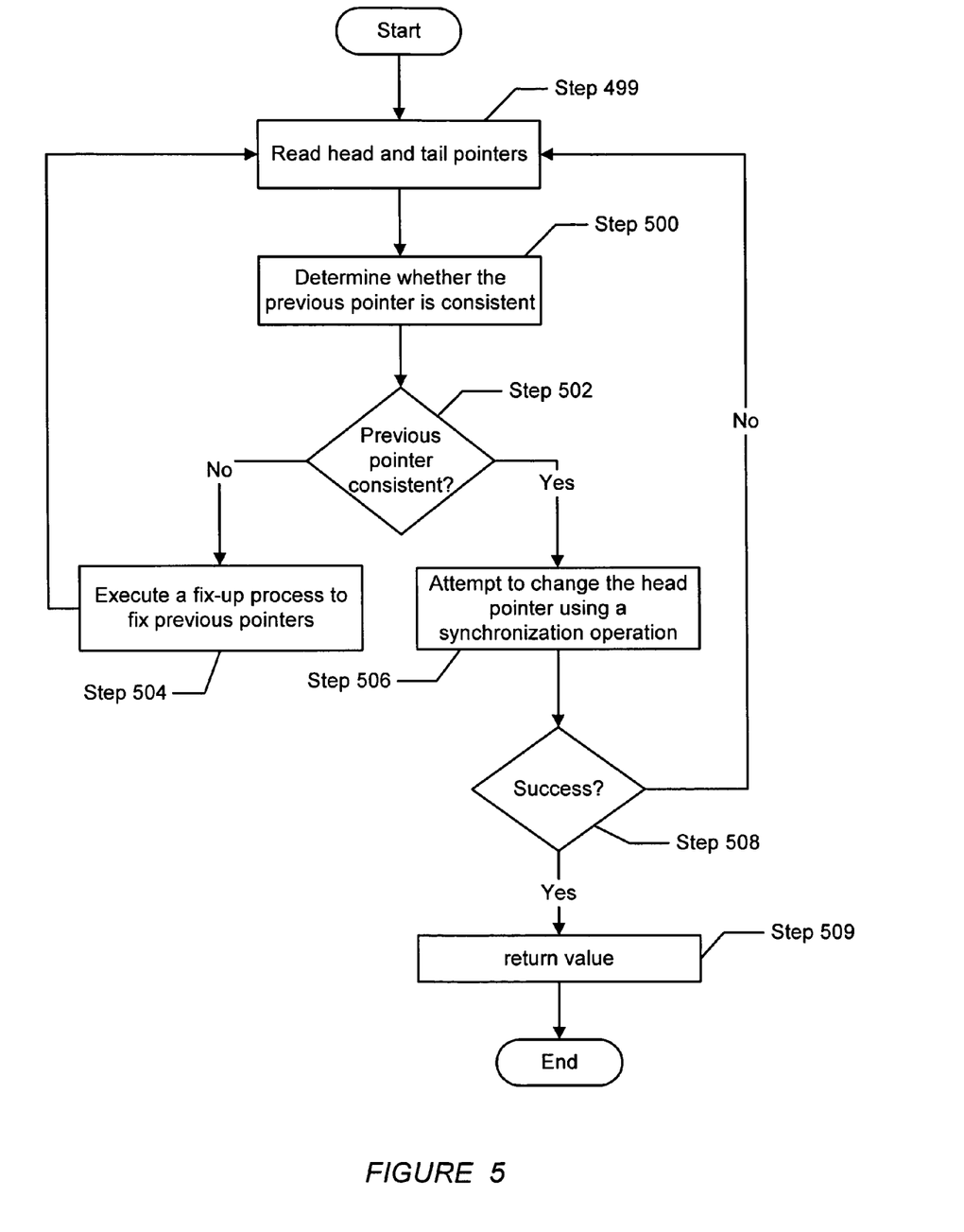

FIG. 5 shows an exemplary flow process for a lock-free dequeue process on an optimistic FIFO queue in accordance with an embodiment of the present invention. Concurrently executing threads execute the steps of this flow process when dequeuing nodes from an optimistic FIFO queue represented as a doubly-linked list with a head pointer and a tail pointer. First, both the head and tail pointers are read (Step 499), and if they both point to the dummy node, the process exits. If the head pointer points to the dummy node and the tail pointer does not, the dummy node is effectively "skipped." Then, a determination is made as to whether the previous pointer of the node to be dequeued is consistent (Step 500). If the previous pointer is not consistent (Step 502), a fix-up process is executed to fix that previous pointer and any other inconsistent previous pointers in the nodes of the doubly-linked list (Step 504). After the fix-up process is executed, the dequeue process restarts (Step 499).

If the previous pointer is consistent (Step 502), an attempt is made to change the head pointer using a single-word synchronization operation (Step 506). The single-word synchronization operation tries to change the head pointer to point to the node pointed to by the previous pointer of the node to be dequeued. If the single-word synchronization operation is not successful (Step 508), the dequeue process restarts (Step 499). The cycle of fixing inconsistent previous pointers (Steps 499, 500, 502, 504) or attempting to change the head pointer if the previous pointer is consistent (Steps 499, 500, 502, 506, 508) may repeat until the single-word synchronization operation is successful. If the single-word synchronization operation is successful (Step 508), the dequeue process returns the value in the dequeued node (Step 509) and subsequently exits.

In one or more embodiments of the present invention, in garbage-collecting languages, a pre-allocated dummy node may not be used. Instead, a node will be defined as a dummy node if it contains a pre-defined dummy value. Thus, during initiation of a queue, a new node with the pre-defined dummy value will be created, and both the tail pointer and the head pointer will be set to point to the new node. When removing the last node in the queue, a new node with the pre-defined dummy value may be created, and the tail point and the head pointer will be set to point to the new node in the same manner as during initiation of the queue described above.

Figure 6A:
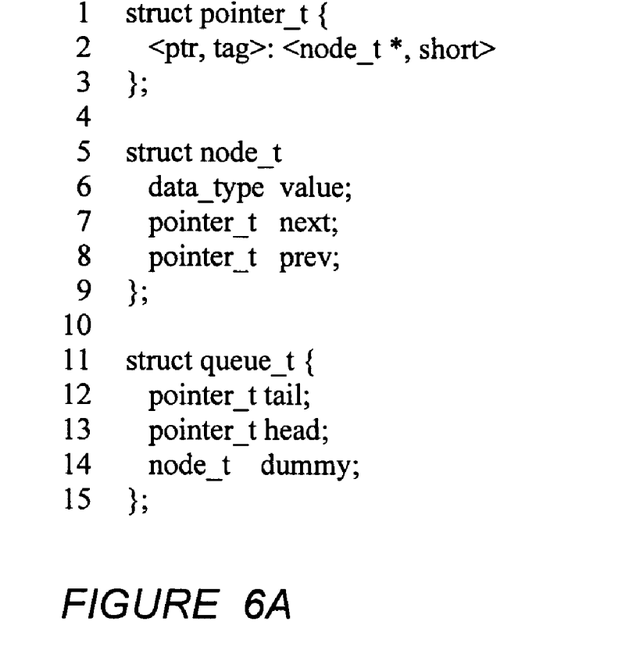
FIGS. 6A-6D show pseudo code in accordance with an embodiment of the invention.

FIGS. 6A-6D show exemplary pseudo code implementing an optimistic FIFO queue in accordance with an embodiment of the present invention. This pseudo code is expressed in the C programming language. One skilled in the art will appreciate that any programming language could be used and the present invention should not be limited to using this pseudo code. As shown in FIG. 6A, an optimistic FIFO queue queue (lines 11-15) is defined as doubly-linked list of nodes (lines 5-9) with a tail pointer tail (line 12), a head pointer head (line 13), and a dummy node dummy (line 14). The dummy node and all nodes in the queue during execution include a value field value (line 6), a next pointer next (line 7), and a previous pointer prev (line 8). Each pointer includes a tag field tag and a pointer field ptr (line 2). The head and tail pointers of queue are initialized to point to dummy when the queue is instantiated in memory (not shown), indicating that the queue is empty. The tag fields of the head and tail pointers are initialized to be zero.

Figure 6B:
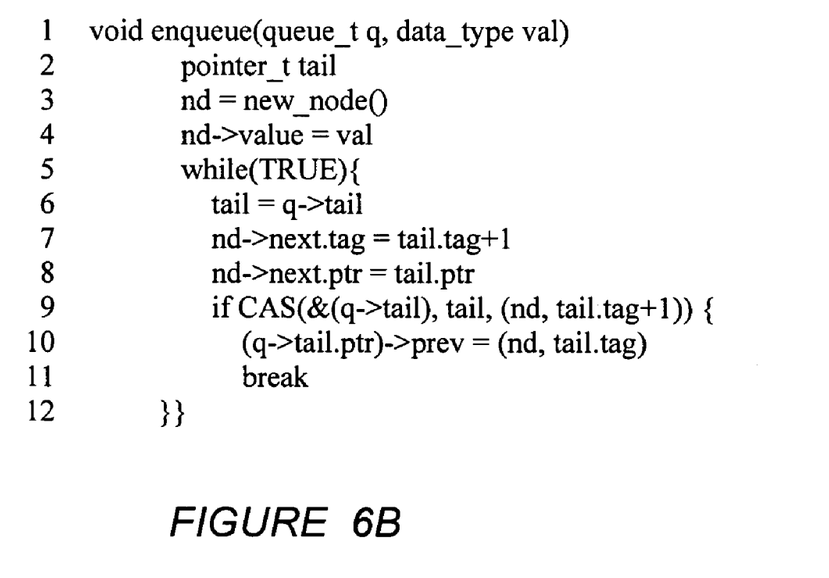

A concurrent thread requests the addition of a value to an optimistic FIFO queue (i.e., an enqueue operation) by invoking the enqueue function shown in FIG. 6B, providing the function with the queue q and the value val to be added (line 1). First, a new node is created that contains the value in the value field (lines 3-4). The tag fields of the next and previous pointers of this node are initialized to be zero when the new node is created (not shown). Then, an attempt is made to insert the new node in the queue q (lines 5-12). The new node's next pointer is set to point to the node currently at the end of the queue q by storing the pointer and tag in the current tail pointer of the queue q in the next pointer of the new node, incrementing the tag (lines 6-8). Then a CAS operation is executed to try to atomically modify the tail pointer to point to the new node and increment the tag in the tail pointer (line 9). If the CAS operation is successful, the previous pointer of the node formerly at the end of the queue q is changed to point to the new node by storing a pointer to the new node and the tag returned by the CAS operation in the previous pointer of that node (line 10). If the CAS operation is not successful, the insertion of the new node is tried again (line 5).

Figure 6C:
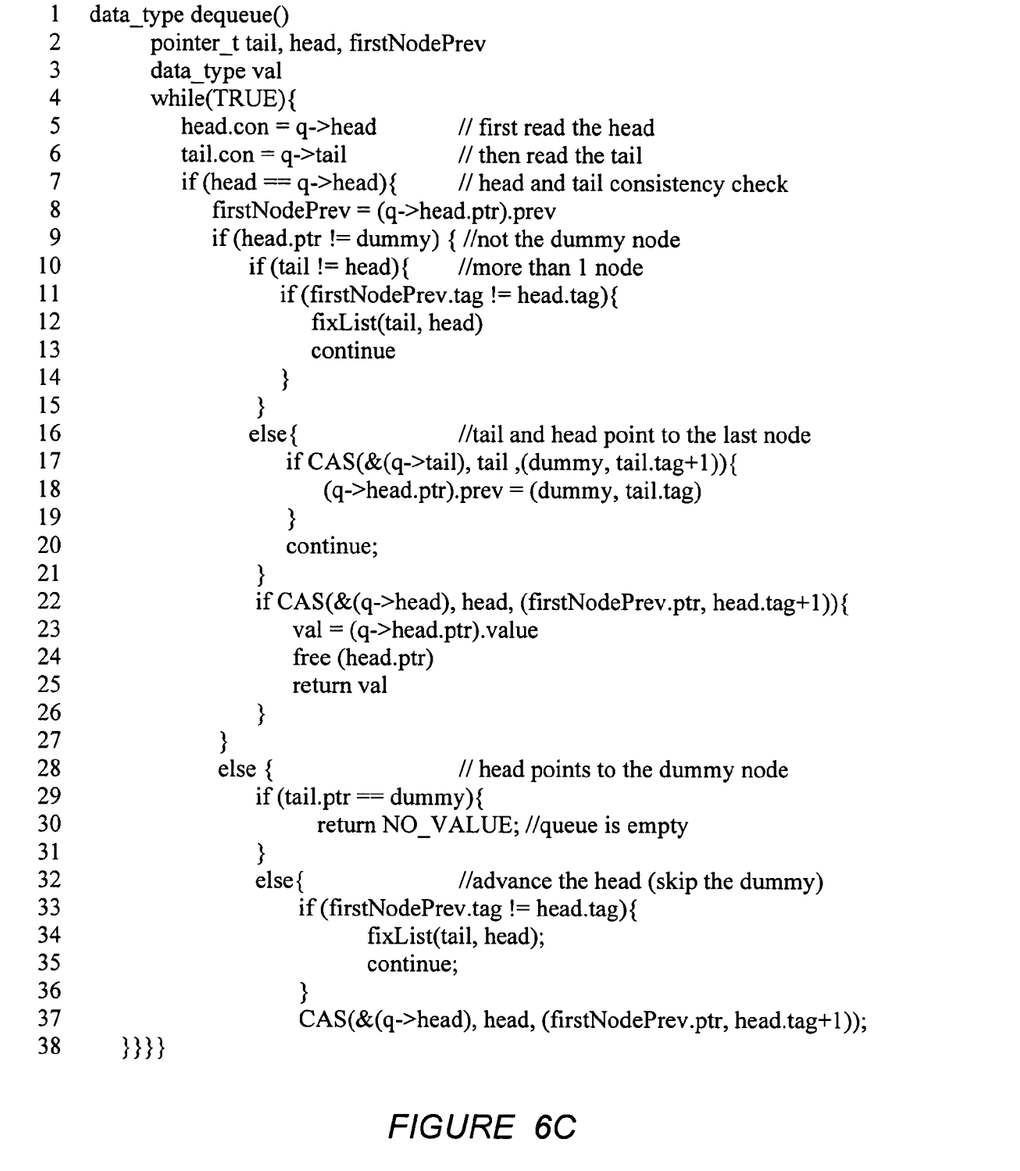
Figure 6D:
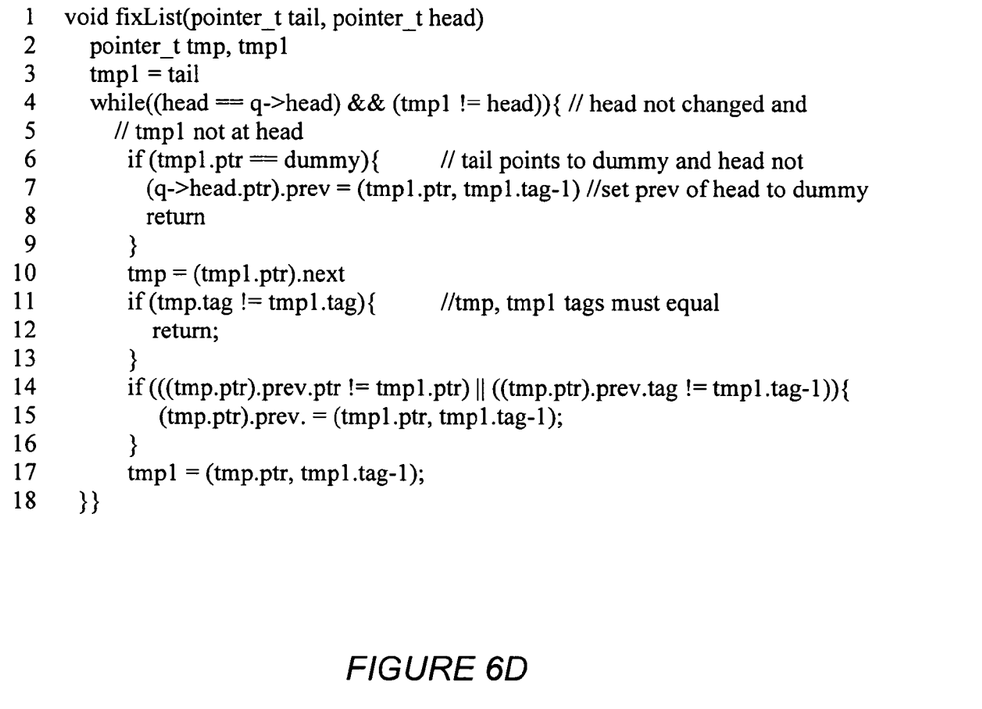

A concurrent thread requests the removal of the oldest value from an optimistic FIFO queue (i.e., an dequeue operation) by invoking the dequeue function shown in FIG. 6C, providing the function with the queue q from which the value is to be removed (line 1). A dequeue process including detecting and handling special states of the queue q (e.g., when there is only one node in the queue q) (lines 9-10, 16-19, and 28-37), fixing inconsistent previous pointers in nodes of the queue q (lines 11-12 and 33-34), and/or removing the oldest value (lines 22-24) is executed until either the oldest value is removed (line 25) or a determination is made that the queue q is empty (line 30).

The flow of this dequeue process, ignoring special states of the queue q (e.g., when the queue q is empty, when there is only one node in the queue q, or when the head pointer points to the dummy node and the tail pointer does not), is as follows: (i) determine whether the previous pointer of the node currently pointed to by the head pointer is consistent (i.e., the tag of the previous pointer is the same as the tag of the head pointer) (line 11); (ii) if the previous pointer is inconsistent, call function fixList, shown in FIG. 6D, to repair inconsistent previous pointers in the nodes of the queue q (line 12 of FIG. 6C); and (iii) if the previous pointer is consistent, attempt to remove the node from the queue q (lines 22-25 of FIG. 6C). The function fixList walks through the queue from the tail to the head along the chain of next pointers, correcting previous pointers in the nodes if the tags of these pointers are inconsistent. If inconsistent previous pointers are repaired or the attempt to remove the node is unsuccessful, the dequeue process restarts (line 13 and line 38 of FIG. 6C).

Referring back to FIG. 6C, the node is removed from the queue q by successfully changing the head pointer of the queue q to point to the next node in the queue q. A CAS operation is executed to try to atomically modify the head pointer to point to the next node and increment the tag in the head pointer (line 22). If the CAS operation is successful, the node is freed (line 24) and the value contained in the node is returned (line 25). If the CAS operation is not successful, the dequeue process restarts.

Embodiments of the present invention provide practical implementations of a concurrent lock-free FIFO queue that yield better performance than other known practical implementations. The enqueue and dequeue operations of the present invention each typically require successful completion of one single-word synchronization operation while the enqueue operation of the best known prior art concurrent lock-free FIFO queue implementation requires the successful completion of two single-word synchronization operations. In addition, contention for the FIFO queue is potentially reduced due to the reduced number of synchronization operations.

Figure 7:
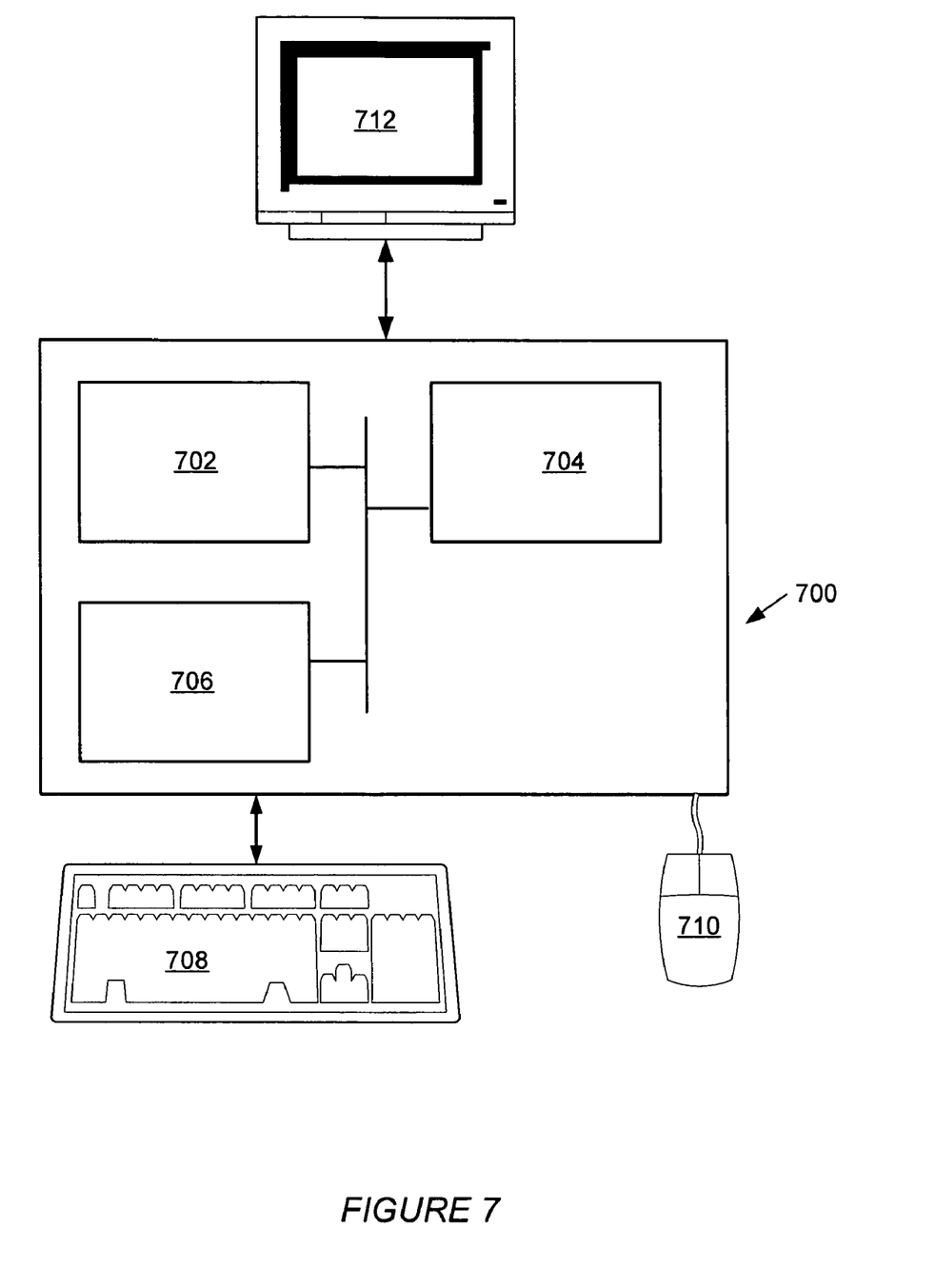
FIG. 7 shows a computer system in accordance with an embodiment of the invention.

Embodiments of the present invention may be implemented on virtually any type of computer regardless of the platform being used. For example, as shown in FIG. 7, a computer system (700) includes a processor (702), associated memory (704), a storage device (706), and numerous other elements typical of today's computers (not shown). The computer system (700) may also include additional processors (not shown) that share the associated memory (704). The computer (700) may also include input means, such as a keyboard (708) and a mouse (710), and output means, such as a monitor (712). The computer system (700) may be connected to a local area network (LAN) (not shown) or a wide area network (WAN) (not shown) via a network interface connection (not shown). Those skilled in the art will appreciate that these input and output means may take other forms. Further, those skilled in the art will appreciate that one or more elements of the aforementioned computer (700) may be located at a remote location and connected to the other elements via a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing computer system operations, comprising:
   implementing a concurrent first-in-first-out (FIFO) queue as a dynamically-sized doubly-linked list in a memory of a computer system;
   enqueuing a node in the concurrent FIFO queue, wherein the enqueuing comprises:
   performing an enqueue operation until a single-word synchronization operation is successful, the enqueue operation comprising:

using a store operation to store a pointer to another node in a next field of the node, wherein the another node is pointed to by a tail pointer;

using the single-word synchronization operation to attempt to store a pointer to the node in the tail pointer; and using a store operation to store a pointer to the node in a previous field of the another node when the single-word synchronization operation is successful, wherein the single-word synchronization operation is the only synchronization operation used during the enqueuing; and dequeuing an enqueued node, wherein the dequeueing comprises:

performing a dequeue operation until one selected from a group consisting of the single-word synchronization operation is successful and the queue is empty, the dequeue operation comprising:

determining whether a previous pointer of the enqueued node is inconsistent;

traversing a plurality of next pointers in the doubly-linked list to correct inconsistent previous pointers in the doubly-linked list when the previous pointer is inconsistent; and using the single-word synchronization operation to attempt to store a pointer to another node in a head pointer, wherein the another node is pointed to by a previous pointer of the enqueued node, wherein the single-word synchronization operation is the only synchronization operation used during the dequeuing.

2. The method of claim 1, wherein the previous pointer is inconsistent when a tag value of the previous pointer is not equal to a tag value of a head pointer.

3. The method of claim 1, wherein the previous pointer is inconsistent when the previous pointer has a null value.

4. A concurrent first-in-first-out (FIFO) queue in a memory of a computer system comprising:

a doubly-linked list comprising a plurality of nodes, wherein each node of the plurality of nodes comprises a value, a next pointer, and a previous pointer;

a head pointer, wherein the head pointer points to an oldest node of the plurality of nodes; and a tail pointer, wherein the tail pointer points to a youngest node of the plurality of nodes, wherein:

when a node is added to the doubly-linked list,
a single-word synchronization operation is used to change the tail pointer, wherein the single-word synchronization operation is the only synchronization operation used in adding the node, and a store operation is used to store a pointer to the node as a previous pointer of the youngest node when the single-word synchronization operation is successful, and when the node is removed from the doubly-linked list and a previous pointer of the node is inconsistent, a fix-up process is executed, wherein the fix-up process comprises traversing a plurality of next pointers in the plurality of nodes to correct inconsistent previous pointers in the plurality of nodes.

5. The concurrent FIFO queue of claim 4, wherein the previous pointer is inconsistent when a tag value of the head pointer is not equal to a tag value of the previous pointer.

6. The concurrent FIFO queue of claim 4, wherein the previous pointer is inconsistent when the previous pointer has a null value.

7. A computer system comprising:

a memory comprising a first-in-first-out (FIFO) queue, wherein the FIFO queue comprises at least one node, and wherein the FIFO queue is implemented as a dynamically-sized doubly-linked list; and a plurality of concurrent threads, wherein each thread of the plurality of concurrent threads comprises instructions to:

enqueue a node in the FIFO queue, wherein the instructions to enqueue perform:

using a store operation to store a pointer to another node in a next field of the node, wherein the another node is pointed to by a tail pointer;

using a single-word synchronization operation to attempt to store a pointer to the node in the tail pointer; and using a store operation to store a pointer to the node in a previous field of the another node when the single-word synchronization operation is successful, wherein the single-word synchronization operation is the only synchronization operation used to enqueue the node; and dequeue an enqueued node, wherein the instructions to dequeue comprise instructions to perform a deque operation until at least one selected from a group consisting of the single-word synchronization operation is successful and the queue is empty occurs, the dequeue operation comprising instructions to:

determine whether a previous pointer of the enqueued node is inconsistent;

traverse a plurality of next pointers in the doubly-linked list to correct inconsistent previous pointers in the doubly-linked list when the previous pointer is inconsistent; and use the single-word synchronization operation to attempt to store a pointer to another node in a head pointer, wherein the another node is pointed to by a previous pointer of the enqueued node, wherein the single-word synchronization operation is the only synchronization operation used to dequeue the enqueued node.

8. The computer system of claim 7, wherein the previous pointer is inconsistent when a tag value of the previous pointer is not equal to a tag value of a head pointer.

9. The computer system of claim 7, wherein the previous pointer is inconsistent when the previous pointer has a null value.

* * * * *